United States Patent
Grewal et al.

(10) Patent No.: US 9,719,389 B2
(45) Date of Patent: Aug. 1, 2017

(54) SYSTEM AND METHOD FOR REDUCING COLD START EMISSIONS USING AN ACTIVE EXHAUST THROTTLE VALVE AND AN EXHAUST GAS RECIRCULATION LOOP

(71) Applicant: GM Global Technology Operations LLC, Detroit, MI (US)

(72) Inventors: Amanpal S. Grewal, Novi, MI (US); Sergio Quelhas, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 14/726,869

(22) Filed: Jun. 1, 2015

(65) Prior Publication Data
US 2016/0348554 A1    Dec. 1, 2016

(51) Int. Cl.
*F01N 3/18* (2006.01)
*F01N 3/20* (2006.01)
(Continued)

(52) U.S. Cl.
CPC .......... *F01N 3/2006* (2013.01); *F01N 3/10* (2013.01); *F01N 9/00* (2013.01); *F02D 9/04* (2013.01); *F02D 21/08* (2013.01); *F02D 41/0055* (2013.01); *F02D 41/0255* (2013.01); *F02D 41/064* (2013.01); *F02M 26/15* (2016.02); *F02M 26/32* (2016.02); *F01N 1/18* (2013.01); *F01N 3/0235* (2013.01); *F01N 9/005* (2013.01); *F01N 11/002* (2013.01); *F01N 11/005* (2013.01); *F01N 2240/02* (2013.01); *F01N 2240/20* (2013.01); *F01N 2240/36* (2013.01); *F01N 2260/14* (2013.01); *F01N 2340/02* (2013.01); *F01N 2560/06* (2013.01); *F01N 2560/08* (2013.01); *F01N 2900/0422* (2013.01); *F01N 2900/0601* (2013.01); *F01N 2900/08* (2013.01); *F01N 2900/1402* (2013.01);
(Continued)

(58) Field of Classification Search
CPC ........ F01N 1/18; F01N 3/0235; F01N 3/2006; F01N 9/005; F01N 11/002; F01N 11/005; F01N 2240/02; F01N 2240/20; F01N 2240/36; F01N 2260/14; F01N 2560/06; F01N 2560/08; F01N 2900/0422; F01N 2900/0601; F01N 2900/08; F01N 2900/1404; F01N 2900/1406; F01N 2900/1602; F01N 2900/1626; F02M 26/10; F02M 26/28
USPC ......... 60/274, 278, 284, 285, 291, 292, 295, 60/300, 320, 324
See application file for complete search history.

(56) References Cited

U.S. PATENT DOCUMENTS

5,277,026 A * 1/1994 Boll ...................... F01N 3/2006
                                                    422/171
5,918,582 A * 7/1999 Itoyama .............. F02D 41/0007
                                                    123/480
(Continued)

*Primary Examiner* — Jorge Leon, Jr.

(57) ABSTRACT

A system according to the principles of the present disclosure includes an engine start module and an exhaust throttle valve control module. The engine start module determines when an engine is started based on at least one of an input from an ignition system and the speed of the engine. The exhaust throttle valve control module selectively fully closes an exhaust throttle valve in an exhaust system of the engine when the engine is started to trap exhaust gas in the exhaust system.

20 Claims, 3 Drawing Sheets

(51) Int. Cl.

| | | |
|---|---|---|
| *F02M 26/15* | (2016.01) | |
| *F02M 26/32* | (2016.01) | |
| *F01N 3/10* | (2006.01) | |
| *F02D 41/02* | (2006.01) | |
| *F02D 9/04* | (2006.01) | |
| *F02D 41/06* | (2006.01) | |
| *F02D 41/00* | (2006.01) | |
| *F02D 21/08* | (2006.01) | |
| *F01N 9/00* | (2006.01) | |
| *F02M 26/28* | (2016.01) | |
| *F01N 3/023* | (2006.01) | |
| *F01N 11/00* | (2006.01) | |
| *F01N 1/18* | (2006.01) | |
| *F02M 26/10* | (2016.01) | |
| *F02D 13/02* | (2006.01) | |

(52) U.S. Cl.
CPC .......... *F01N 2900/1404* (2013.01); *F01N 2900/1406* (2013.01); *F01N 2900/1602* (2013.01); *F01N 2900/1626* (2013.01); *F02D 41/0245* (2013.01); *F02D 2013/0292* (2013.01); *F02M 26/10* (2016.02); *F02M 26/28* (2016.02)

(56) References Cited

U.S. PATENT DOCUMENTS

| | | | | |
|---|---|---|---|---|
| 6,109,027 A * | 8/2000 | Schaefer | .......... | F02D 9/04 123/323 |
| 6,230,682 B1 * | 5/2001 | Gustafsson | .......... | F02D 9/06 123/323 |
| 6,240,723 B1 * | 6/2001 | Ito | .......... | F02B 3/06 123/568.21 |
| 6,668,548 B1 * | 12/2003 | Asanuma | .......... | F01N 3/0814 60/284 |
| 2002/0157384 A1 * | 10/2002 | Hirota | .......... | F01N 3/023 60/295 |
| 2003/0221671 A1 * | 12/2003 | Bidner | .......... | F01N 3/0814 123/406.47 |
| 2007/0193565 A1 * | 8/2007 | Brevick | .......... | F02D 41/0082 123/568.11 |
| 2008/0209887 A1 * | 9/2008 | Hanari | .......... | F02B 39/16 60/277 |
| 2010/0024395 A1 * | 2/2010 | Gotou | .......... | F01N 3/023 60/277 |
| 2010/0199957 A1 * | 8/2010 | Furukawa | .......... | F02D 9/04 123/568.12 |
| 2010/0223921 A1 * | 9/2010 | Uhrich | .......... | F01N 3/0807 60/311 |
| 2011/0010079 A1 * | 1/2011 | Shutty | .......... | F02D 35/027 701/108 |
| 2011/0072801 A1 * | 3/2011 | Lupescu | .......... | F01N 3/031 60/287 |
| 2011/0107739 A1 * | 5/2011 | Shimizu | .......... | F01N 3/2006 60/273 |
| 2012/0011831 A1 * | 1/2012 | Neisen | .......... | F02D 41/0235 60/285 |
| 2013/0101474 A1 * | 4/2013 | Nakayama | .......... | F01N 3/0814 422/182 |
| 2014/0053548 A1 * | 2/2014 | Peters | .......... | F02M 26/59 60/602 |
| 2014/0196454 A1 * | 7/2014 | Ulrey | .......... | F01N 3/10 60/605.2 |
| 2015/0059680 A1 * | 3/2015 | Yoshida | .......... | F02P 5/1502 123/179.21 |

\* cited by examiner

SYSTEM AND METHOD FOR REDUCING COLD START EMISSIONS USING AN ACTIVE EXHAUST THROTTLE VALVE AND AN EXHAUST GAS RECIRCULATION LOOP

FIELD

The present disclosure relates to internal combustion engines, and more specifically, to systems and methods for reducing cold start emissions using an active exhaust throttle valve and an exhaust gas recirculation loop.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Combustion of an air/fuel mixture within cylinders of an engine yields exhaust gas, which is expelled from the cylinders into an exhaust system before being released into the atmosphere. The exhaust system includes a catalytic converter that reduces emissions that are present in the exhaust gas. The catalytic converter reduces emissions most effectively when the temperature of a catalyst within the catalytic converter is greater than or equal to an activation temperature.

When an engine is started after the engine is shutdown for an extended period, referred to as a cold start, the catalyst temperature may be less than the activation temperature. Thus, the ability of the catalytic converter to reduce emissions may be diminished. In addition, when the engine is started, the air/fuel ratio of the engine may be adjusted to a rich value to ensure that the engine starts. Thus, the exhaust gas may contain elevated levels of emissions such as hydrocarbons relative to normal operation. The diminished ability of the catalytic converter to reduce emission and the elevated levels of emissions due to rich operation may cause a greater amount of emissions to be released into the atmosphere during a cold start relative to normal operation.

SUMMARY

A system according to the principles of the present disclosure includes an engine start module and an exhaust throttle valve control module. The engine start module determines when an engine is started based on at least one of an input from an ignition system and the speed of the engine. The exhaust throttle valve control module selectively fully closes an exhaust throttle valve in an exhaust system of the engine when the engine is started to trap exhaust gas in the exhaust system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In some engine systems, a catalytic converter is located adjacent to the engine so that the catalytic converter heats up quickly when the engine is started due to its proximity to the engine. A catalytic converter located in this manner may be referred to as a close-coupled catalytic converter. Since a close-coupled catalytic converter is located adjacent to the engine, the close-coupled catalytic converter may reach its activation temperature quicker during a cold start relative to a catalytic converter that is located further away from the engine. Thus, the close-coupled catalytic converter may reduce cold start emissions more effectively than other catalytic converters. However, a close-coupled catalytic converter may not reduce emissions as effectively as desired.

A system and method according to the present disclosure uses an active exhaust throttle valve disposed downstream of a catalytic converter to trap exhaust gas in an exhaust system during a cold start. In turn, the catalytic converter reaches its activation temperature quicker during a cold start relative to catalytic converters in other exhaust systems. In addition, the system and method uses an exhaust gas recirculation (EGR) loop to redirect the trapped exhaust gas to an intake system of the engine. Thus, instead of releasing cold start emissions into the atmosphere, the system and method redirects the cold start emissions to the intake system so that the cold start emissions are consumed via combustion within the cylinders of the engine. In various implementations, the EGR loop is cooled by a heat exchanger to increase the volume of exhaust gas that may be trapped within the EGR loop during a cold start.

Figure 1:
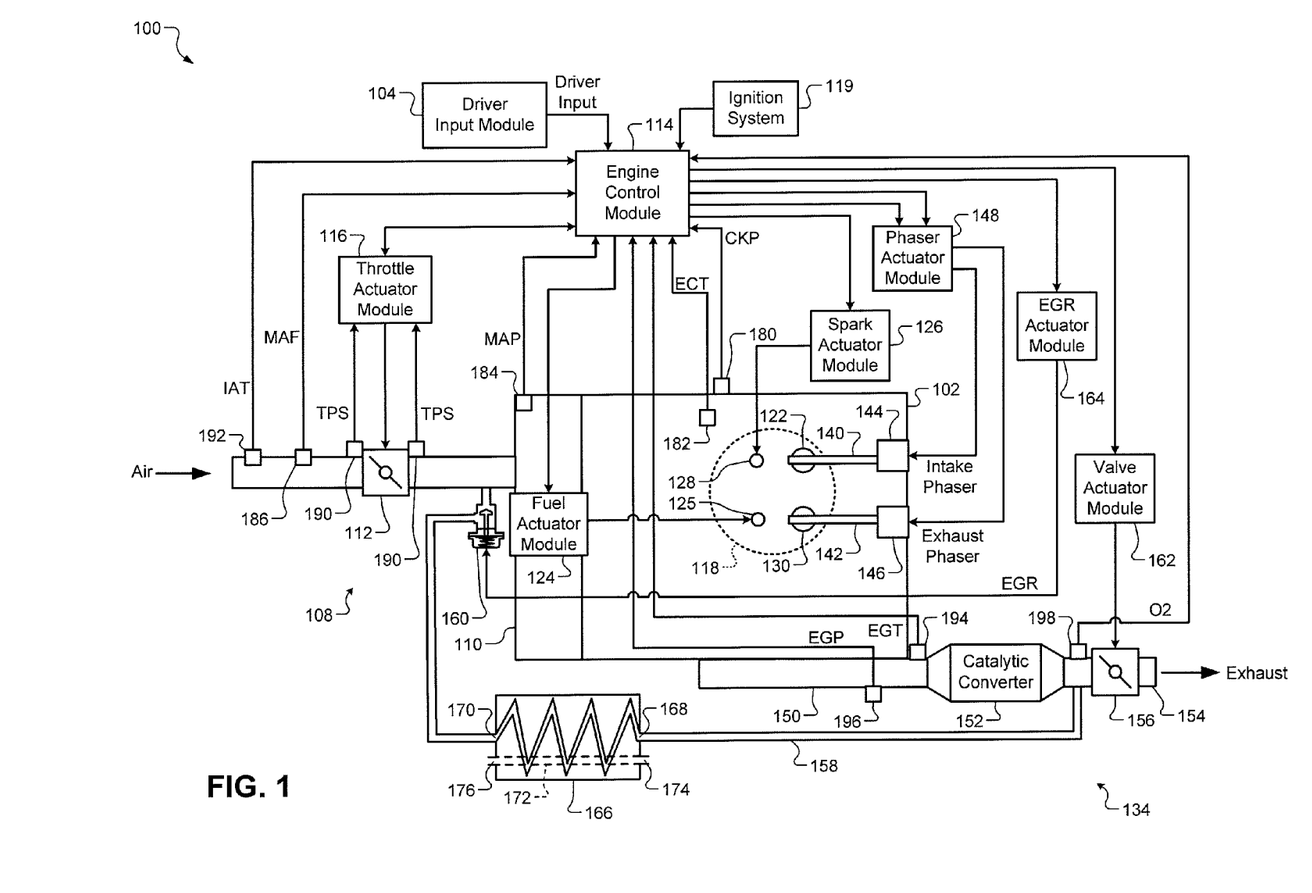
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The ECM 114 may start and stop the engine 102 based on an input received from an ignition system 119. The ignition system 119 may include a key or a button. The ECM 114 may start the engine 102 when a driver turns the key from an off position to an on (or run) position or when the driver presses the button. The ECM 114 may stop the engine 102 when the driver turns the key from the on position to the off position or when the driver presses the button while the engine 102 is running.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 144. The time at which the exhaust valve 130 is opened may be varied with respect to piston TDC by an exhaust cam phaser 146. A phaser actuator module 148 may control the intake and exhaust cam phasers 144 and 146 based on signals from the ECM 114. When implemented, variable valve lift may also be controlled by the phaser actuator module 148.

The ECM 114 may deactivate the cylinder 118 by instructing the phaser actuator module 148 to disable opening of the intake valve 122 and/or the exhaust valve 130. The phaser actuator module 148 may disable opening of the intake valve 122 by decoupling the intake valve 122 from the intake camshaft 140. Similarly, the phaser actuator module 148 may disable opening of the exhaust valve 130 by decoupling the exhaust valve 130 from the exhaust camshaft 142. In various implementations, the phaser actuator module 148 may control the intake valve 122 and/or the exhaust valve 130 using devices other than camshafts, such as electromagnetic or electrohydraulic actuators.

The exhaust system 134 includes an exhaust manifold 150, a catalytic converter 152, an exhaust line 154, an active exhaust throttle valve 156, an exhaust gas recirculation (EGR) loop 158, and an EGR valve 160. The exhaust manifold 150 receives exhaust gas expelled from the cylinders of the engine 102. The catalytic converter 152 is located downstream from and adjacent to the exhaust manifold 150. When the engine 102 is started, the catalytic converter 152 heats up quickly due to its proximity to the engine 102, and a catalyst in the catalytic converter 152 reduces cold start emissions such as hydrocarbons. In this regard, the catalytic converter 152 may be referred to as a close-coupled catalytic converter.

The exhaust line 154 is located downstream from the catalytic converter 152, and the active exhaust throttle valve 156 is disposed in the exhaust line 154. Exhaust gas exiting the exhaust line 154 is released into the atmosphere. In various implementations, a second catalytic converter (not shown) may be coupled to the exhaust line 154, and exhaust gas may pass through the second catalytic converter before being released into the atmosphere.

The active exhaust throttle valve 156 is adjustable between a fully open position and a fully closed position and, in various implementations, to positions in between the fully open position and the fully closed position. The active exhaust throttle valve 156 allows exhaust gas flow from the exhaust system 134 to the atmosphere when the active exhaust throttle valve 156 is open. The active exhaust throttle valve 156 prevents exhaust gas flow from the exhaust system 134 to the atmosphere when the active exhaust throttle valve 156 is fully closed. A valve actuator module 162 controls the active exhaust throttle valve 156 based on a signal from the ECM 114.

The EGR loop 158 extends from the exhaust line 154, at a location that is upstream from the active exhaust throttle valve 156, to the EGR valve 160. The EGR valve 160 is adjustable to a fully open position, a fully closed position, and to positions between the fully open position and the fully closed position. A portion of exhaust gas flowing through the exhaust line 154 is redirected through the EGR loop 158 to the intake system 108 when the EGR valve 160 is at least partially open. An EGR actuator module 164 controls the EGR valve 160 based on a signal from the ECM 114.

In the example shown, the exhaust system 134 also includes a heat exchanger 166 through which the EGR loop 158 extends. Coolant circulated through the heat exchanger 166 absorbs heat from exhaust gas passing through a portion of the EGR loop 158 that extends through the heat exchanger 166. This allows the EGR loop 158 to trap a greater volume of exhaust gas when the active exhaust throttle valve 156 is closed relative to an uncooled EGR loop. However, in various implementations, the heat exchanger 166 may be omitted, and the volume of the EGR loop 158 may be increased by, for example, increasing the diameter of the EGR loop 158 and/or arranging the EGR loop 158 in a serpentine pattern.

The heat exchanger 166 includes an EGR inlet 168, an EGR outlet 170, a coolant passage 172, a coolant inlet 174 and a coolant outlet 176. Exhaust gas flowing through the EGR loop 158 enters the heat exchanger 166 through the EGR inlet 168 and exits the heat exchanger 166 through the EGR outlet 170. Coolant flows through the coolant passage 172 and absorbs heat from exhaust gas flowing through the portion of the EGR loop 158 that extends through the heat exchanger 166. Coolant enters the coolant passage 172 of the heat exchanger 166 through the coolant inlet 174 and exits the coolant passage 172 of the heat exchanger 166 through the coolant outlet 176. Coolant circulated through the engine 102 may also be circulated through the heat exchanger 166, or the coolant passage 172 may be isolated from coolant passages (not shown) in the engine 102.

In the example shown, the portion of the EGR loop 158 that extends through the heat exchanger 166 is arranged in a serpentine pattern, and the coolant passage 172 extends in a straight line adjacent to the EGR loop 158. However, the EGR loop 158 may extend through the heat exchanger 166 in other patterns, such as in a straight line, and the coolant passage 172 may extend in other patterns, such as in a spiral pattern that winds around the EGR loop 158. In addition, the coolant passage 172 may include a plurality of passages and/or the entire interior of the heat exchanger 166 may be filled with coolant that surrounds the portion of the EGR loop 158 extending through the heat exchanger 166.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown). The pressure within the intake manifold 110 may be measured using a manifold absolute pressure (MAP) sensor 184. In various implementations, engine vacuum, which is the difference between ambient air pressure and the pressure within the intake manifold 110, may be measured.

The mass flow rate of air flowing into the intake manifold 110 may be measured using a mass air flow (MAF) sensor 186. In various implementations, the MAF sensor 186 may be located in a housing that also includes the throttle valve 112. The throttle actuator module 116 may monitor the position of the throttle valve 112 using one or more throttle position sensors (TPS) 190. The ambient temperature of air being drawn into the engine 102 may be measured using an intake air temperature (IAT) sensor 192.

The temperature of exhaust gas passing through the exhaust system 134 may be measured using an exhaust gas temperature (EGT) sensor 194. The pressure of exhaust gas passing through the exhaust system 134 may be measured using an exhaust gas pressure (EGP) sensor 196. The EGT sensor 194 and the EGP sensor 196 may be located upstream from the catalytic converter 152, as shown, in the catalytic converter 152, or between the catalytic converter 152 and the active exhaust throttle valve 156. The level of oxygen in exhaust gas flowing through the exhaust system 134 may be measured using an oxygen (O2) sensor 198. The O2 sensor 198 may be located between the catalytic converter 152 and the active exhaust throttle valve 156 as shown and, in various implementations, a second O2 sensor may be located upstream from the catalytic converter 152.

The ECM 114 uses signals from the sensors and other inputs to make control decisions for the engine system 100. For example, the ECM 114 fully closes the active exhaust throttle valve 156 when the engine 102 is started and a temperature of the catalyst within the catalytic converter is less than a predetermined temperature. This traps cold start emissions in the exhaust system 134. The ECM 114 may also adjust the phasers 144, 146 to positions yielding zero valve overlap to maximize the pressure and temperature buildup in the exhaust system 134. In addition, the ECM 114 fully opens the EGR valve 160 during a cold start to purge ambient air from the EGR loop 158 to make room for exhaust gas, and then closes the EGR valve 160 over a period to gradually consume the trapped cold start emissions. In various implementations, a check valve may be positioned at the junction between the exhaust line 154 and the EGR loop 158 to prevent exhaust flow from the EGR loop 158 to the exhaust line 154.

Figure 2:
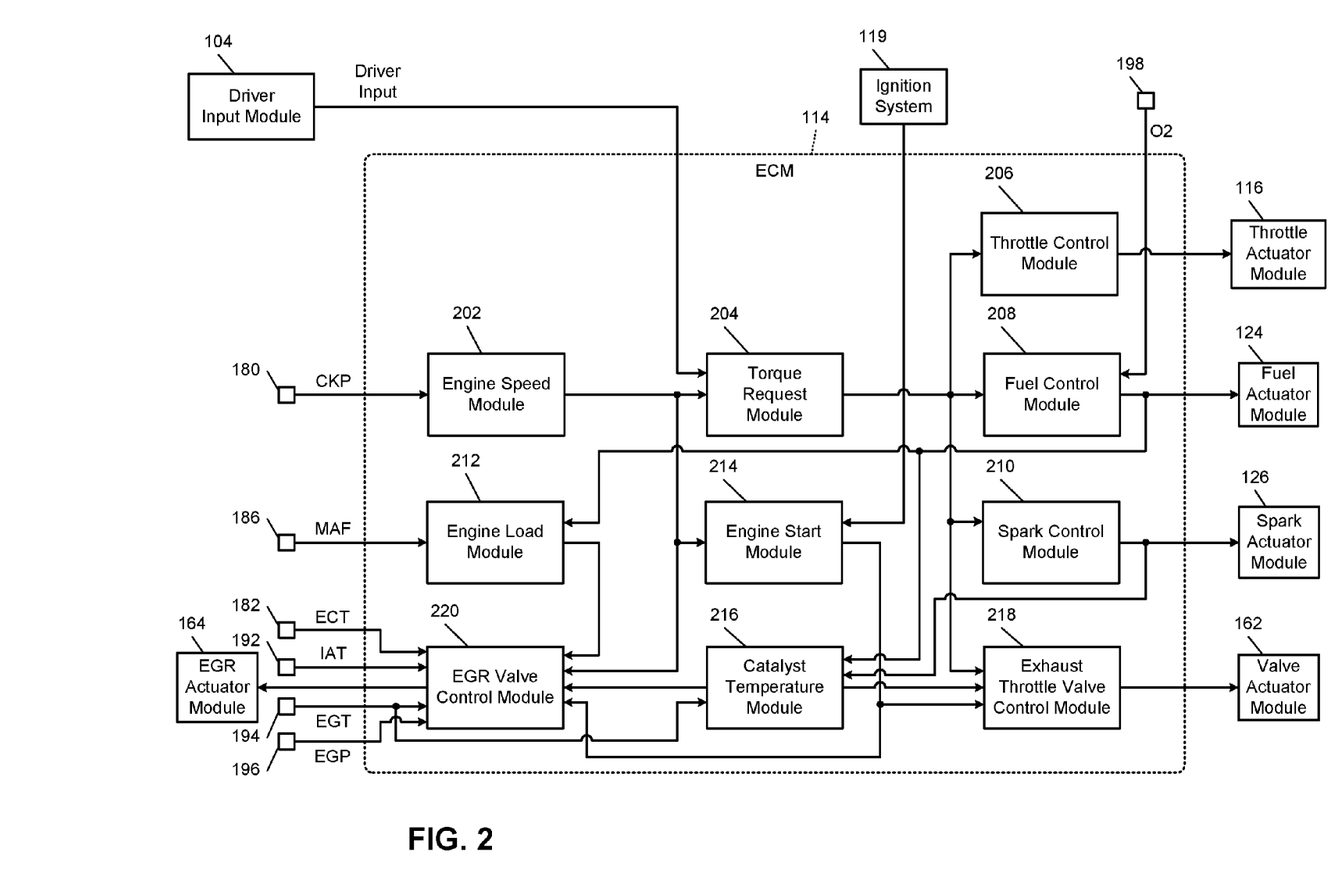
FIG. 2 is a functional block diagram of an example control system according to the principles of the present disclosure.

Referring now to FIG. 2, an example implementation of the ECM 114 includes an engine speed module 202, a torque request module 204, a throttle control module 206, a fuel control module 208, and a spark control module 210. The engine speed module 202 determines the speed of the engine 102 based on the crankshaft position from the CKP sensor 180. For example, the engine speed module 202 may calculate the engine speed based on a period that elapses as the crankshaft completes one or more revolutions. The engine speed module 202 outputs the engine speed.

The torque request module 204 determines a torque request based on the driver input from the driver input module 104. For example, the torque request module 204 may store one or more mappings of accelerator pedal position to desired torque and determine the torque request based on a selected one of the mappings. The torque request module 204 may select one of the mappings based on the engine speed and/or vehicle speed. The torque request module 204 outputs the torque request.

The throttle control module 206 controls the throttle valve 112 by instructing the throttle actuator module 116 to achieve a desired throttle area. The fuel control module 208 controls the fuel injector 125 by instructing the fuel actuator module 124 to achieve a desired injection amount and/or a desired injection timing. The spark control module 210 controls the spark plug 128 by instructing the spark actuator module 126 to achieve desired spark timing.

The throttle control module 206 and the spark control module 210 may adjust the desired throttle area and the desired spark timing, respectively, based on the torque request. The throttle control module 206 may increase or decrease the desired throttle area when the torque request increases or decreases, respectively. The spark control module 210 may advance or retard the spark timing when the torque request increases or decreases, respectively.

The fuel control module 208 may adjust the desired injection amount and/or the desired injection timing to achieve a desired air/fuel ratio such as a stoichiometric air/fuel ratio. For example, the fuel control module 208 may adjust the desired injection amount and/or the desired injection timing to minimize a difference between an actual air/fuel ratio and the desired air/fuel ratio. Controlling the air/fuel ratio in this way may be referred to as closed-loop control of the air/fuel ratio. The fuel control module 208 may start performing closed-loop control of the air/fuel ratio when the temperature of the catalyst within the catalytic converter 152 reaches its activation temperature.

The example implementation of the ECM 114 shown in FIG. 2 also includes an engine load module 212, an engine start module 214, a catalyst temperature module 216, an exhaust throttle valve control module 218, and an EGR valve control module 220. The engine load module 212 determines the amount of load acting on the engine 102. The engine load module 212 may use the mass flow rate of intake air from the MAF sensor 186 and/or the desired injection amount from the fuel control module 208 as an approximation of the engine load. Alternatively, the engine load module 212 may determine the engine load using a predetermined mapping of intake airflow and/or fuel delivery amount to engine load. The engine load module 212 outputs the engine load.

The engine start module 214 determines when the engine 102 is started based on the engine speed and/or an input from the ignition system 119. For example, the ignition system 119 may include a key or a button, and the engine start module 214 may determine that the engine 102 is started when a signal from the ignition system 119 indicates that the key is in an on (or run) position or the button is pressed. In another example, the engine start module 214 may determine that the engine is started when the engine speed is greater than or equal to a predetermined (e.g., idling) speed. The engine start module 214 outputs a signal indicating whether the engine 102 is started.

The catalyst temperature module 216 determines the temperature of the catalyst within the catalytic converter 152. The catalyst temperature module 216 may estimate the catalyst temperature based on the exhaust gas temperature from the EGT sensor 194, the timing of spark generated in the cylinders of the engine 102, and/or the amount of fuel delivered to cylinders. For example, the catalyst temperature module 216 may estimate the catalyst temperature based on a predetermined relationship between the spark timing, the fuel delivery amount, and the catalyst temperature. The predetermined relationship may be embodied in a lookup table and/or an equation. The catalyst temperature module 216 may receive the desired injection amount and the desired spark timing from the fuel control module 208 and the spark control module 210, respectively. The catalyst temperature module 216 may use the desired injection amount and the desired spark timing as approximations of the actual injection amount and the actual spark timing, respectively.

The exhaust throttle valve control module 218 controls the active exhaust throttle valve 156 by instructing the valve actuator module 162 to achieve a desired exhaust throttle valve position. The exhaust throttle valve control module 218 adjusts the active exhaust throttle valve 156 to a fully closed position when the engine 102 is started to trap exhaust gas in the exhaust system 134. The exhaust throttle valve control module 218 determines when the engine 102 is started based on the signal from the engine start module 214.

The exhaust throttle valve control module 218 may adjust the active exhaust throttle valve 156 from the fully closed position to a fully open position when the catalyst temperature is greater than or equal to a predetermined temperature. The predetermined temperature may be equal to the activation temperature of the catalyst within the catalytic converter 152, which may be between 300 degrees Celsius (° C.) and 400° C. In various implementations, the exhaust throttle valve control module 218 may adjust the active exhaust throttle valve 156 from the fully closed position to a partially open position when the catalyst temperature is greater than or equal to the predetermined temperature.

The exhaust throttle valve control module 218 may adjust the active exhaust throttle valve 156 from the fully closed position to the fully open position when the catalyst temperature is less than the predetermined temperature if other conditions satisfy predetermined criteria. For example, the exhaust throttle valve control module 218 may adjust the active exhaust throttle valve 156 from the fully closed position to the fully open position independent of the catalyst temperature when the torque request is greater than a predetermined value. The torque request may be greater than the predetermined value when the driver adjusts the accelerator pedal to a position corresponding to wide open throttle.

In another example, the exhaust throttle valve control module 218 may adjust the active exhaust throttle valve 156 from the fully closed position to the fully open position independent of the catalyst temperature when the capacity of the EGR loop 158 to store exhaust gas is reached. The exhaust throttle valve control module 218 may determine whether the capacity of the EGR loop 158 to store exhaust gas is reached based on the volume of the EGR loop 158, the engine speed, and the engine load.

The EGR valve control module 220 controls the EGR valve 160 by instructing the EGR actuator module 164 to achieve a desired EGR valve position. The EGR valve control module 220 may adjust the EGR valve 160 to a fully open position when the engine 102 is started to purge ambient air from the EGR loop 158. The EGR valve control module 220 may then maintain the EGR valve 160 in the fully open position for a first period (e.g., 5 to 7 seconds).

When the first period ends, the EGR valve control module 220 may adjust the EGR valve 160 from the fully open position to a fully closed position to trap cold start emissions in the exhaust system 134, which causes the exhaust system pressure to increase. The EGR valve control module 220 may maintain the EGR valve 160 in the fully closed position until the exhaust gas pressure from the EGP sensor 196 is equal to a maximum pressure. Additionally or alternatively, the EGR valve control module 220 may maintain the EGR valve 160 in the fully closed position until the exhaust gas temperature from the EGT sensor 194 is equal to a maximum temperature. The maximum pressure and the maximum temperature may be predetermined.

When the exhaust gas pressure is equal to the maximum pressure and/or the exhaust gas temperature is equal to the maximum temperature, the EGR valve control module 220 may modulate the EGR valve 160 between partially open positions. For example, the EGR valve control module 220 may modulate the EGR valve 160 between a first partially open position (e.g., 3 percent open) and a second partially open position (e.g., 10 percent open). The EGR valve control module 220 may modulate the EGR valve 160 betweeen partially open positions for a second period (e.g., 60 seconds). Modulating the EGR valve 160 between partially open positions as described above purges trapped exhaust gas from the exhaust system 134 to the intake system 108. In turn, cold start emissions in the exhaust gas are consumed via combustion in the cylinders of the engine 102.

The EGR valve control module 220 may determine the first period based on the engine speed, the engine load, the exhaust gas temperature from the EGT sensor 194, the exhaust gas pressure from the EGP sensor 196, and/or the volume of the EGR loop 158. For example, the EGR valve control module 220 may determine the first period based on a predetermined relationship between the engine speed, the engine load, the exhaust gas temperature, the exhaust gas pressure, and the first period. The predetermined relationship may be embodied in a lookup table and/or an equation.

The EGR valve control module 220 may determine the second period based on the volume of the EGR loop 158, a combustion tolerance of the engine 102, ambient air temperature, the engine coolant temperature from the ECT sensor 182, and/or a soak time of the engine 102. For example, the EGR valve control module 220 may determine the second period based on a predetermined relationship between combustion tolerance, ambient air temperature, engine coolant temperature, engine soak time, and the first period. The predetermined relationship may be embodied in a lookup table and/or an equation.

The intake air temperature from the IAT sensor 192 may be used as an approximation of the ambient air temperature. The soak time of the engine 102 is the amount of time that the engine 102 is shutdown before the engine 102 is restarted. The EGR valve control module 220 may determine the engine soak time based on the signal from the engine start module 214.

The combustion tolerance of the engine 102 is a measure of the ability of the engine 102 to consume exhaust gas while maintaining cylinder-to-cylinder combustion variability at a value that is less than a predetermined level. The coefficient of variation in indicated mean effective pressure (IMEP) may be used as an approximation of the combustion tolerance of the engine 102. The coefficient of variation in IMEP is equal to the standard deviation of the IMEP over the IMEP, and may be expressed as a percent.

The EGR valve control module 220 may determine the combustion tolerance of the engine 102 based on the engine speed, the engine load, the engine coolant temperature from the ECT sensor 182, and/or the intake air temperature from the IAT sensor 192. For example, the EGR valve control module 220 may determine the combustion tolerance based on a predetermined relationship between engine speed, engine load, engine coolant temperature, intake air temperature, and combustion tolerance. The predetermined relationship may be embodied in a lookup table and/or an equation, and may be developed using in-cylinder pressure sensors.

Figure 3:
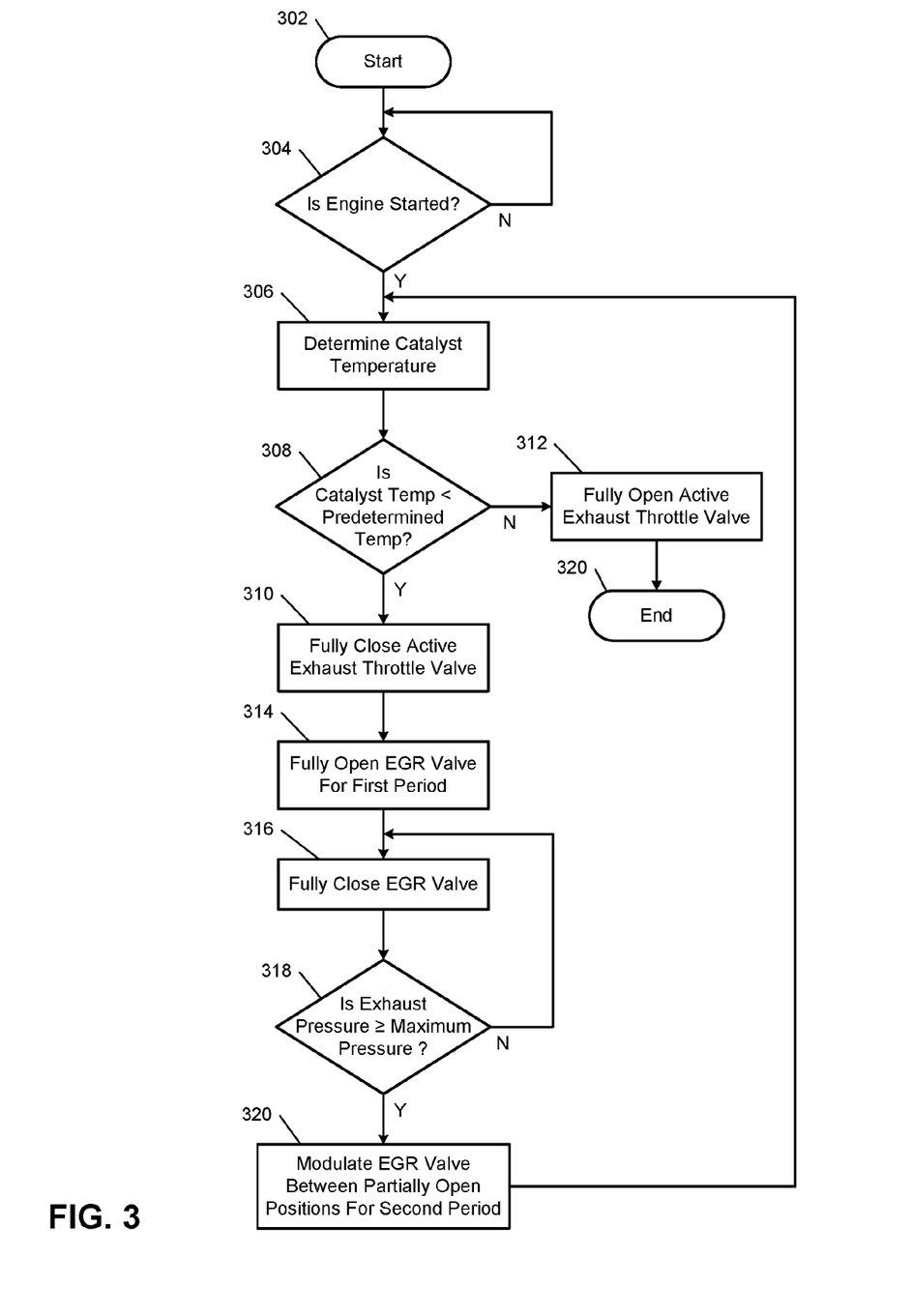
FIG. 3 is a flowchart illustrating an example control method according to the principles of the present disclosure.

Referring now to FIG. 3, a method for reducing cold start emissions using the active exhaust throttle valve 156 and the EGR loop 158 begins at 302. The method is described in the context of the modules of FIG. 2. However, the particular modules that perform the steps of the method may be different than the modules mentioned below and/or the method may be implemented apart from the modules of FIG. 2.

At 304, the engine start module 214 determines whether the engine 102 is started. If the engine 102 is started, the method continues at 306. Otherwise, the engine start module 214 continues to determine whether the engine 102 is started at 304. At 306, the catalyst temperature module 216 determines the catalyst temperature.

At 308, the exhaust throttle valve control module 218 and/or the EGR valve control module 220 determine(s) whether the catalyst temperature is less than the predetermined temperature. If the catalyst temperature is less than the predetermined temperature, the method continues at 310. Otherwise, the method continues at 312. At 312, the exhaust throttle valve control module 218 fully opens the active exhaust throttle valve 156.

At 310, the exhaust throttle valve control module 218 fully closes the active exhaust throttle valve 156 to trap exhaust gas in the exhaust system 134. At 314, the EGR valve control module 220 fully opens the EGR valve 160 for the first period. At 316, the EGR valve control module 220 fully closes the EGR valve 160. At 318, the EGR valve control module 220 determines whether the exhaust gas pressure from the EGP sensor 196 is greater than or equal to the maximum pressure. Additionally or alternatively, the EGR valve control module 220 may determine whether the exhaust gas temperature from the EGT sensor 194 is greater than or equal to the maximum temperature. If the exhaust gas pressure is greater than or equal to the maximum pressure and/or the exhaust gas temperature is greater than or equal to the maximum temperature, the method continues at 320. Otherwise, the method continues at 316. At 320, the method modulates the EGR valve 160 between partially open positions for the second period. The method ends at 320.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
   an engine start circuit that determines when an engine is started based on at least one of an input from an ignition system and a speed of the engine; and
   an exhaust throttle valve control circuit that:
      selectively fully closes an exhaust throttle valve in an exhaust system of the engine when the engine is started to trap exhaust gas in the exhaust system; and
      selectively fully opens the exhaust throttle valve independent of a temperature of a catalyst in the exhaust;
      determines whether a capacity of an exhaust gas recirculation (EGR) loop to store exhaust gas is reached based on a volume of the EGR loop, engine speed, and engine load; and
      fully opens the exhaust throttle valve when the capacity of the EGR loop to store exhaust gas is reached.

2. The system of claim 1 further comprising a catalyst temperature circuit that determines a temperature of a catalyst in the exhaust system, wherein the exhaust throttle valve control circuit fully closes the exhaust throttle valve when the engine is started and the catalyst temperature is less than a predetermined temperature.

3. The system of claim 2 wherein the catalyst temperature circuit estimates the catalyst temperature based on an amount of fuel delivered to cylinders of the engine and a timing of spark generated in the cylinders.

4. The system of claim 2 further comprising an exhaust gas recirculation (EGR) valve control circuit that opens an EGR valve when the engine is started to allow gas to flow from the exhaust system to an intake system of the engine through an EGR loop.

5. The system of claim 4 further comprising:
   the exhaust throttle valve;
   the EGR loop;
   the EGR valve; and
   a heat exchanger including a coolant passage, wherein coolant in the coolant passage absorbs heat from exhaust gas in the EGR loop when the engine is started.

6. The system of claim 4 wherein the EGR valve control circuit adjusts the EGR valve to a fully open position when the engine is started, maintains the EGR valve in the fully open position for a first period, and then adjusts the EGR valve from the fully open position to a fully closed position.

7. The system of claim 6 wherein the EGR valve control circuit modulates the EGR valve between partially open positions for a second period when at least one of:
   exhaust pressure is greater than or equal to a predetermined pressure; and
   exhaust temperature is greater than or equal to a predetermined temperature.

8. The system of claim 7 wherein the EGR valve control circuit determines the second period based on a volume of the EGR loop, a combustion tolerance of the engine, an ambient air temperature, an engine coolant temperature, and a soak time of the engine.

9. The system of claim 1 wherein the exhaust throttle valve control circuit fully opens the exhaust throttle valve when a torque request is greater than a predetermined value.

10. A method comprising:
- determining when an engine is started based on at least one of an input from an ignition system and a speed of the engine;
- selectively fully closing an exhaust throttle valve in an exhaust system of the engine when the engine is started to trap exhaust gas in the exhaust system;
- selectively fully opening the exhaust throttle valve independent of a temperature of a catalyst in the exhaust system;
- determining whether a capacity of an exhaust gas recirculation (EGR) loop to store exhaust gas is reached based on a volume of the EGR loop, engine speed, and engine load; and
- fully opening the exhaust throttle valve when the capacity of the EGR loop to store exhaust gas is reached.

11. The method of claim 10 further comprising:
- determining a temperature of a catalyst in the exhaust system; and
- fully closing the exhaust throttle valve when the engine is started and the catalyst temperature is less than a predetermined temperature.

12. The method of claim 11 further comprising estimating the catalyst temperature based on an amount of fuel delivered to cylinders of the engine and a timing of spark generated in the cylinders.

13. The method of claim 11 further comprising opening an EGR valve when the engine is started to allow gas to flow from the exhaust system to an intake system of the engine through an EGR loop.

14. The method of claim 13 further comprising cooling exhaust gas in the EGR loop using a heat exchanger when the engine is started, the heat exchanger including a coolant passage, wherein coolant in the coolant passage absorbs heat from exhaust gas in the EGR loop.

15. The method of claim 13 further comprising:
- adjusting the EGR valve to a fully open position when the engine is started;
- maintaining the EGR valve in the fully open position for a first period; and
- when the first period ends, adjusting the EGR valve from the fully open position to a fully closed position.

16. The method of claim 15 further comprising modulating the EGR valve between partially open positions for a second period when at least one of:
- exhaust pressure is greater than or equal to a predetermined pressure; and
- exhaust temperature is greater than or equal to a predetermined temperature.

17. The method of claim 16 further comprising determining the second period based on a volume of the EGR loop, a combustion tolerance of the engine, an ambient air temperature, an engine coolant temperature, and a soak time of the engine.

18. The method of claim 10 further comprising fully opening the exhaust throttle valve when a torque request is greater than a predetermined value.

19. A system comprising:
- an engine start circuit that determines when an engine is started based on at least one of an input from an ignition system and a speed of the engine;
- an exhaust throttle valve control circuit that selectively fully closes an exhaust throttle valve in an exhaust system of the engine when the engine is started to trap exhaust gas in the exhaust system;
- a catalyst temperature circuit that determines a temperature of a catalyst in the exhaust system, wherein the exhaust throttle valve control circuit fully closes the exhaust throttle valve when the engine is started and the catalyst temperature is less than a predetermined temperature, wherein the exhaust throttle valve control circuit fully opens the exhaust throttle valve when the catalyst temperature is greater than or equal to the predetermined temperature; and
- an exhaust gas recirculation (EGR) valve control circuit that opens an EGR valve when the engine is started to allow gas to flow from the exhaust system to an intake system of the engine through an EGR loop, wherein the EGR valve control circuit adjusts the EGR valve to a fully open position when the engine is started, maintains the EGR valve in the fully open position for a first period, and then adjusts the EGR valve from the fully open position to a fully closed position, and wherein the EGR valve control circuit determines the first period based on engine speed, engine load, exhaust pressure, exhaust temperature, and a volume of the EGR loop.

20. A method comprising:
- determining when an engine is started based on at least one of an input from an ignition system and a speed of the engine;
- selectively fully closing an exhaust throttle valve in an exhaust system of the engine when the engine is started to trap exhaust gas in the exhaust system;
- determining a temperature of a catalyst in the exhaust system;
- fully closing the exhaust throttle valve when the engine is started and the catalyst temperature is less than a predetermined temperature;
- opening an EGR valve when the engine is started to allow gas to flow from the exhaust system to an intake system of the engine through an EGR loop;
- adjusting the EGR valve to a fully open position when the engine is started;
- maintaining the EGR valve in the fully open position for a first period;
- when the first period ends, adjusting the EGR valve from the fully open position to a fully closed position; and
- determining the first period based on engine speed, engine load, exhaust pressure, exhaust temperature, and a volume of the EGR loop.

* * * * *